INVENTOR.
John S. Young
BY C. A. Gulbrandsen
Atty.

May 8, 1962 J. S. YOUNG 3,033,938

PRIVATE AUTOMATIC BRANCH EXCHANGE TELEPHONE SYSTEM PROVIDING TRANSFER SERVICE

Filed Feb. 2, 1960 6 Sheets-Sheet 2

INVENTOR.
John S. Young
BY C. A. Gulbrandsen
Atty.

INVENTOR.
John S. Young
BY
C. A. Gulbrandsen
Atty.

May 8, 1962 J. S. YOUNG 3,033,938

PRIVATE AUTOMATIC BRANCH EXCHANGE TELEPHONE SYSTEM PROVIDING TRANSFER SERVICE

Filed Feb. 2, 1960 6 Sheets-Sheet 4

INVENTOR.
John S. Young

BY
C. A. Gulbrandsen
Atty.

INVENTOR.
John S. Young
BY C. A. Gullbrandsen
Atty.

INVENTOR.
John S. Young
BY C. A. Gulbrandsen
Atty.

United States Patent Office 3,033,938
Patented May 8, 1962

3,033,938

PRIVATE AUTOMATIC BRANCH EXCHANGE TELEPHONE SYSTEM PROVIDING TRANSFER SERVICE

John S. Young, Addison, Ill., assignor to Automatic Electric Laboratories, Inc., a corporation of Delaware Filed Feb. 2, 1960, Ser. No. 6,309
7 Claims. (Cl. 179—27)

The present invention relates to telephone systems in general and more particularly to improvements in private automatic branch exchange systems associated with central exchanges by way of two-way trunk lines extending therebetween.

A conventional private automatic branch exchange (hereinafter referred to as a PABX) normally comprises an attendant's cabinet, or operator's position, a number of subscriber stations, a plurality of two-way trunk lines extending between the PABX and a central exchange (or central office) associated therewith, a plurality of subscriber lines individually extending to subscriber substations and apparatus including a switch train having access to each of the subscriber and trunk lines, with this apparatus being operated to set up connections between the various subscribers. Usually the apparatus in a PABX of this type is so connected and arranged that the connections between the various subscriber lines can be set up by the local subscribers at the subscriber substations without the assistance of the operator or the attendant. Normally the apparatus is so connected and so arranged that local subscribers at a number of the substations can also initiate outgoing trunk calls from the PABX over an idle one of the two-way trunk lines without the assistance of the operator or the attendant.

Universally, the former PABX telephone systems were so arranged that incoming trunk calls to the PABX over the two-way trunk lines were answered at the attendant's cabinet and then extended to the desired subscriber station by the attendant. Usually the attendant's cabinet of this PABX was provided with a night switch or night answering key, which was operated before the attendant left the attendant's cabinet or went off duty in order to provide the necessary answering service.

The main object of the invention is the provision of new and improved circuit arrangements for use in a private automatic branch exchange telephone system of the general type such as shown in U.S. Patent Number 2,056,752, issued October 6, 1936, to John H. Voss, by simplifying and reducing the cost thereof without sacrificing any of the desirable operating features, and yet enabling the desired features of private automatic branch exchange service to be given more efficiently and satisfactorily.

One of the features of the invention relates to the provision of improved circuit arrangements, whereby incoming calls from a central office may be readily transferred.

Another feature of the invention relates to the provision of an improved circuit adapter and other circuit arrangements, whereby the transfer of an incoming call from a central office may be initiated by the called local PABX subscriber and completed by the PABX attendant.

A further feature of the invention relates to the provision of an improved circuit adapter and other circuit arrangements, whereby the transfer of an incoming call from a central office may be initiated and completed by the same called local PABX subscriber.

A still further feature of the invention relates to the provision of an improved circuit arrangement, whereby an incoming call from a central office may repeatedly be re-transferred from one local PABX subscriber to another.

Another feature of the invention relates to the provision of improved circuit arrangements, whereby the above-mentioned re-transfer may be initiated by the first-called local PABX subscriber and thereafter completed by either the same first-called local PABX subscriber that initiated it or by the attendant, depending on the condition of specific controlling means at the attendant's cabinet.

Still another feature of the invention relates to the provision of an alarm, and a control therefor, used in conjunction with the improved circuit arrangement, whereby the alarm sounds to indicate that the transfer of a call has been initiated and subsequently abandoned or the transfer is not completed for some reason.

A further feature of the invention relates to the provision of improved circuit arrangements, whereby the above-mentioned partially transferred and subsequently abandoned call may be connected with, responsive to any local PABX subscriber dialling a predetermined three digit transfer call number.

Another feature of the invention relates to the provision of improved circuit arrangements, whereby the local PABX subscriber that initiated and completed the transfer to another local PABX subscriber may also remain in the connection, thereby providing a three party conference.

A still further feature of the invention relates to the provision of improved circuit arrangements, whereby either of the two local PABX subscribers in the above-mentioned three party conference may initiate and complete another transfer and/or another three party conference call, provided the other of the two local subscribers has retired from the connection.

Another feature of the invention relates to the provision of improved circuit arrangements rendered effective for initiating the transfer of an incoming call in response to the called local PABX subscriber either dialling the single digit 1 or in response to the local subscriber momentarily depressing his hook switch a single time.

Further features of the invention relate to the particular arrangement of the circuit elements thereof, whereby the above outlined and additional operating features are attained.

The novel features believed to be characteristic of the invention are set forth with particularity in the appended claims, while the invention both as to its organization and method of operation, together with further objects and advantages thereof, will best be understood by reference to the following detailed operational description taken in conjunction with the accompanying drawings comprising FIGS. 1 through 7 inclusive, which show by means of the usual circuit diagrams, a sufficient amount of apparatus to enable the invention to be described and understood.

In the drawings, FIGS. 1 and 2 illustrate the general trunking arrangement of a telephone system including a private automatic branch exchange incorporating the present invention, while FIGS. 3 through 7, inclusive, taken together as called for in the trunking diagram, illustrate the details of a system having incorporated therein the features of the invention as briefly outlined above.

Figure 5:
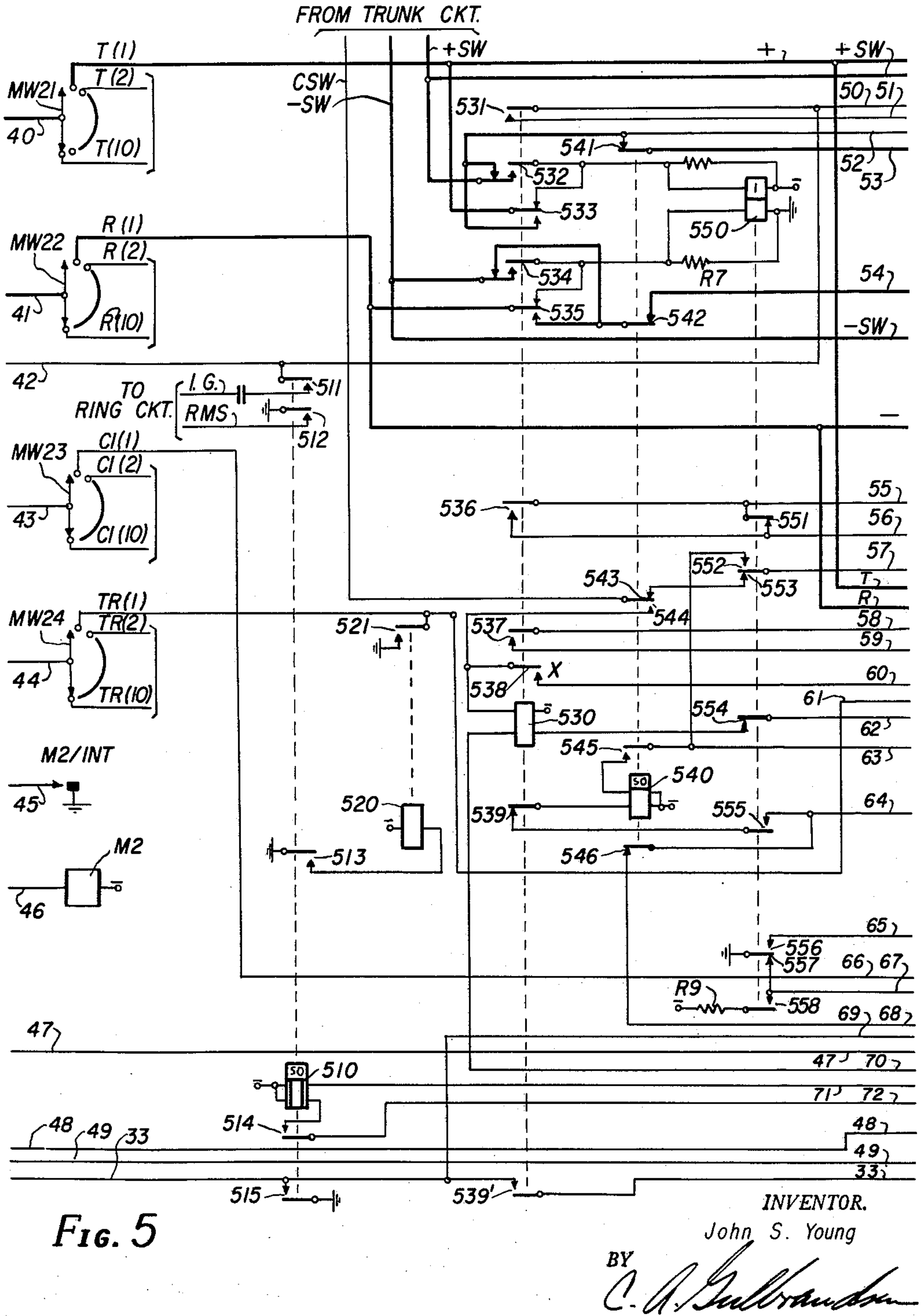

FIG. 5 discloses the remainder of the transfer allotter switch at its extreme left, while the right-hand portion of FIG. 5 represents the part of the adapter circuit that is operated to initiate the transfer.

Figure 6:
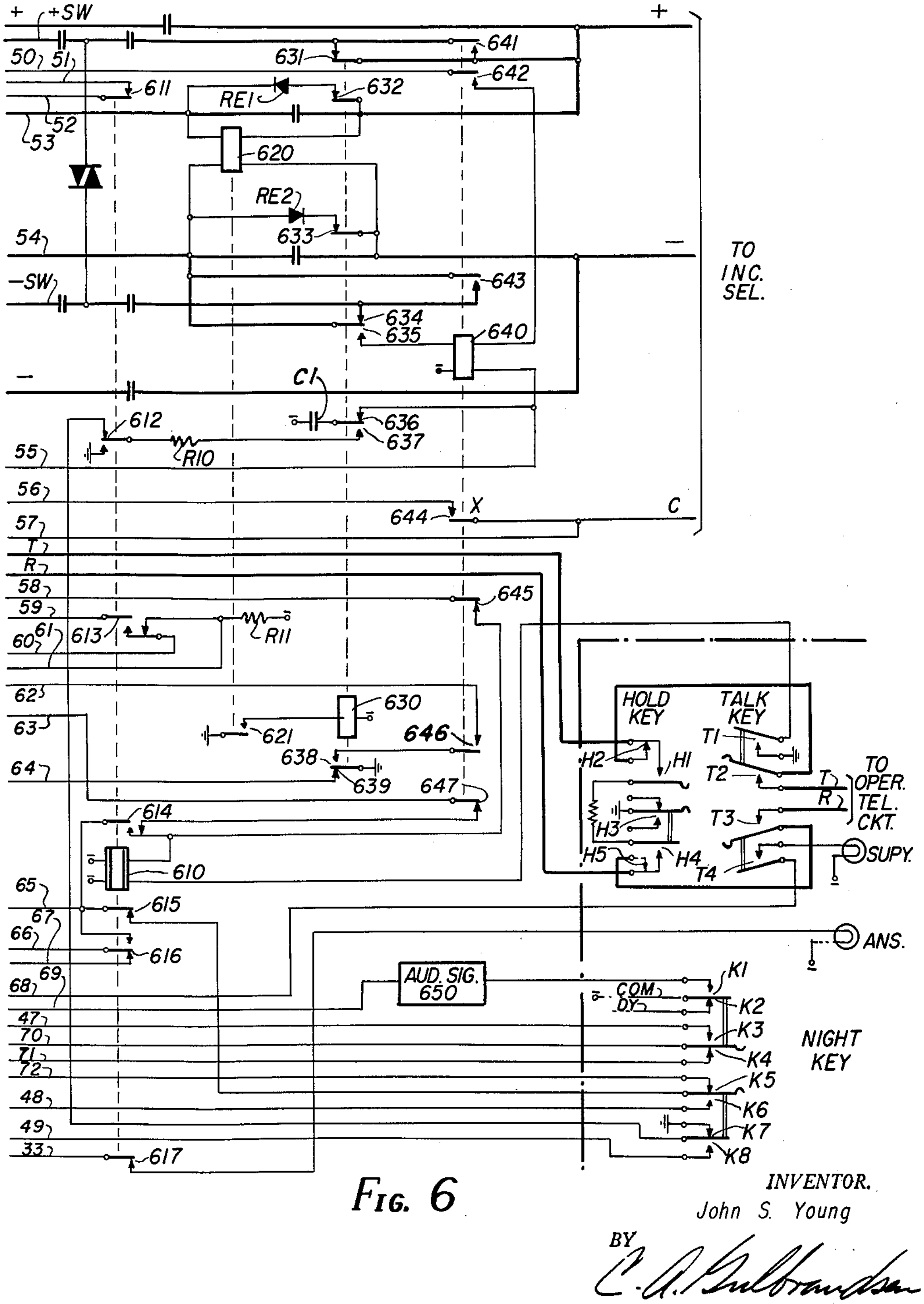

FIG. 6 represents the remaining portion of the adapter circuit and in the lower right-hand corner discloses briefly the equipment at the attendant's cabinet necessary to support the later-described detailed operational description.

Figures 2, 7:
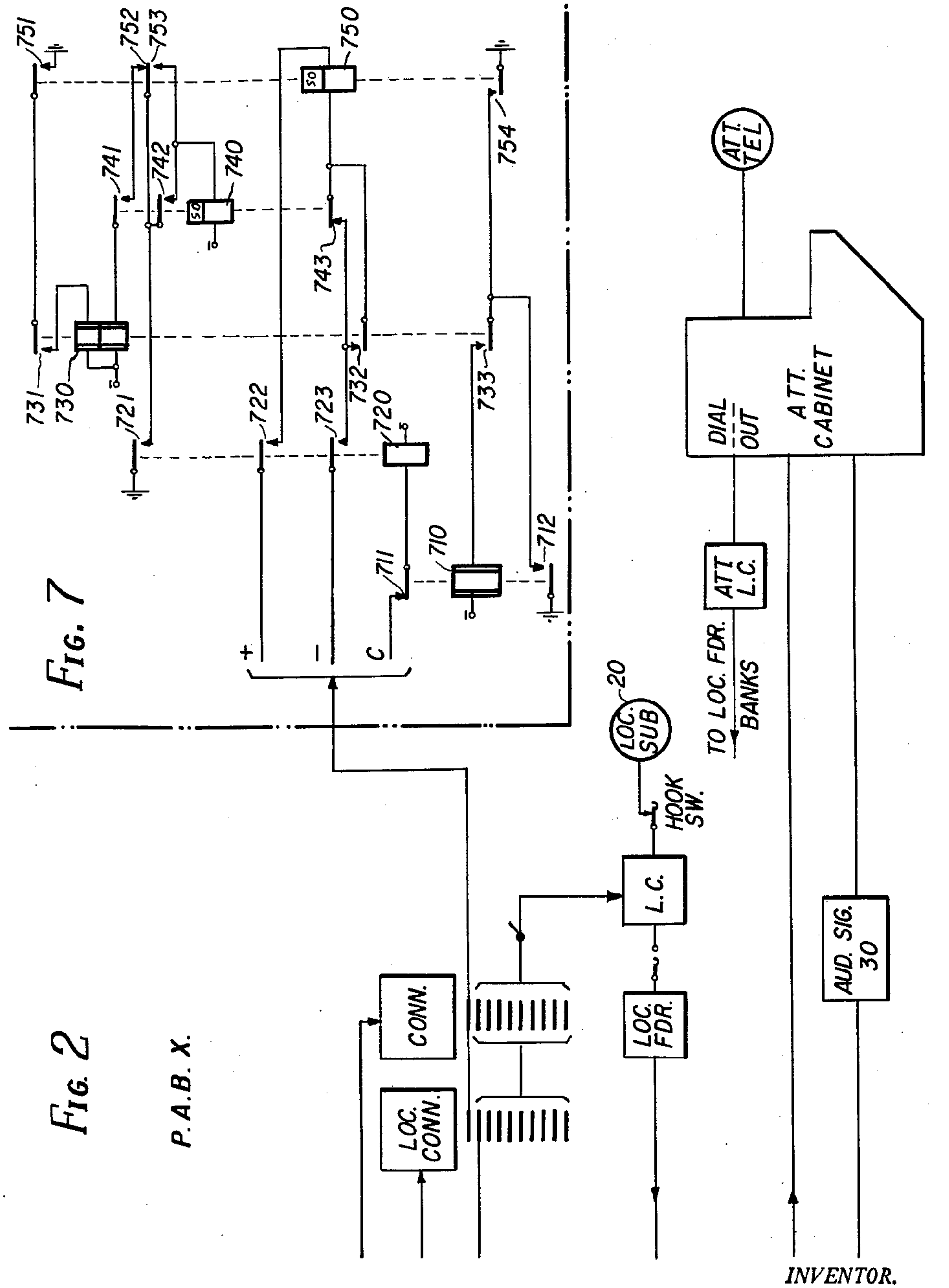

FIG. 7 is shown to the right of FIG. 2 and represents an automatic answer, attendant signalling and transfer initiating circuit.

A brief description of the invention will be given in the following general description.

*General Description*

Figure 1:
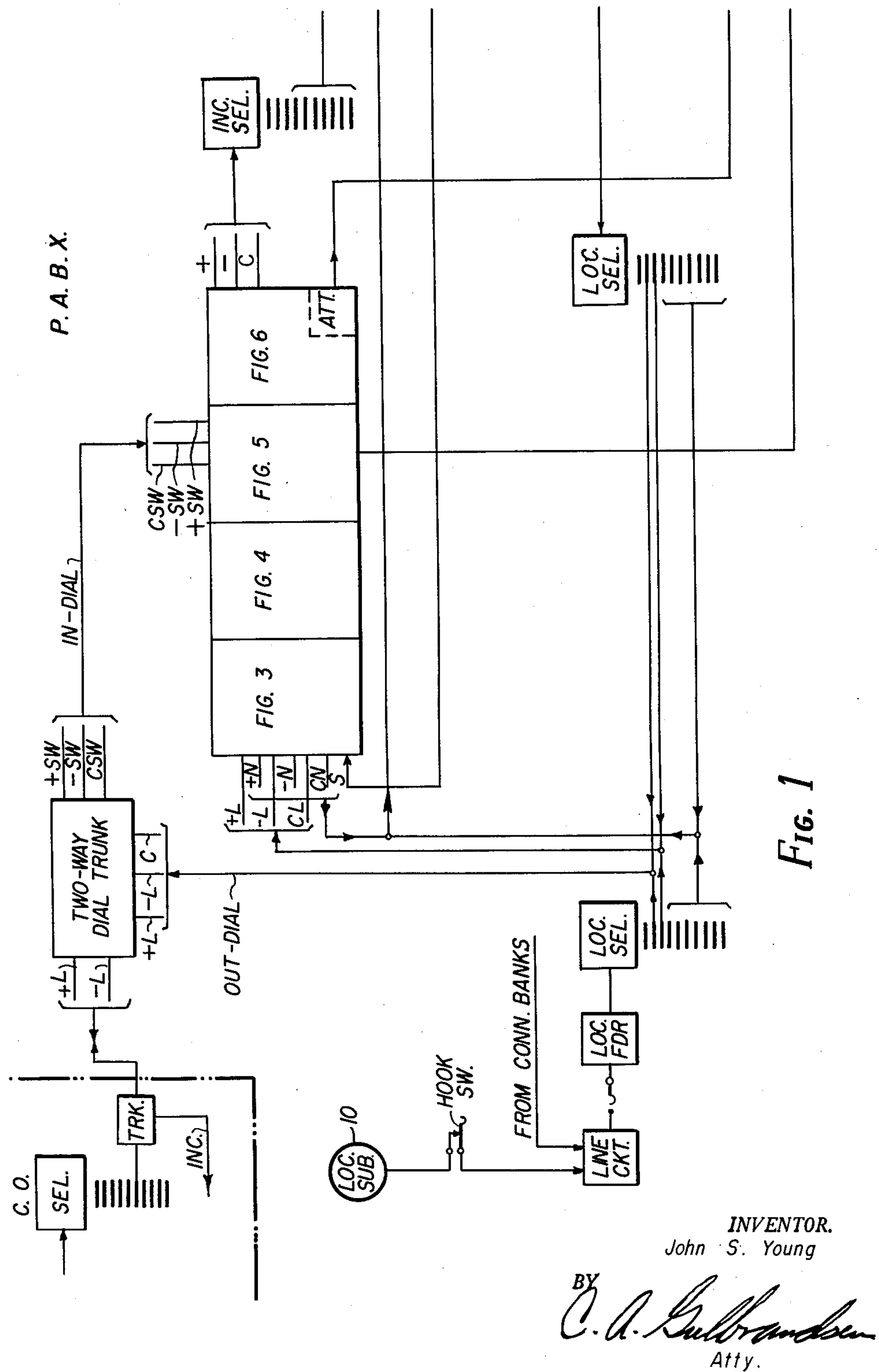

Referring to the trunking diagram comprising FIGS. 1 and 2 and the detailed drawings comprising FIGS. 3, 4, 5, 6 and 7, it will be noted from the trunking diagram that the detailed drawings should be arranged as shown in order to more clearly describe the operations and for a better understanding thereof.

It will be noted that the two-way dial trunk, the incoming selector, the connector, local connectors, local finders, line circuits and local selectors are all shown in box diagram and may be of any well-known and suitable type adaptable for use with the present system. However, it will be further noted that the incoming selector, the associated connector, the local selectors and the local connectors have been shown to be of the well-known Strowger type and as such will not be explained in detail in this specification.

Figure 3:
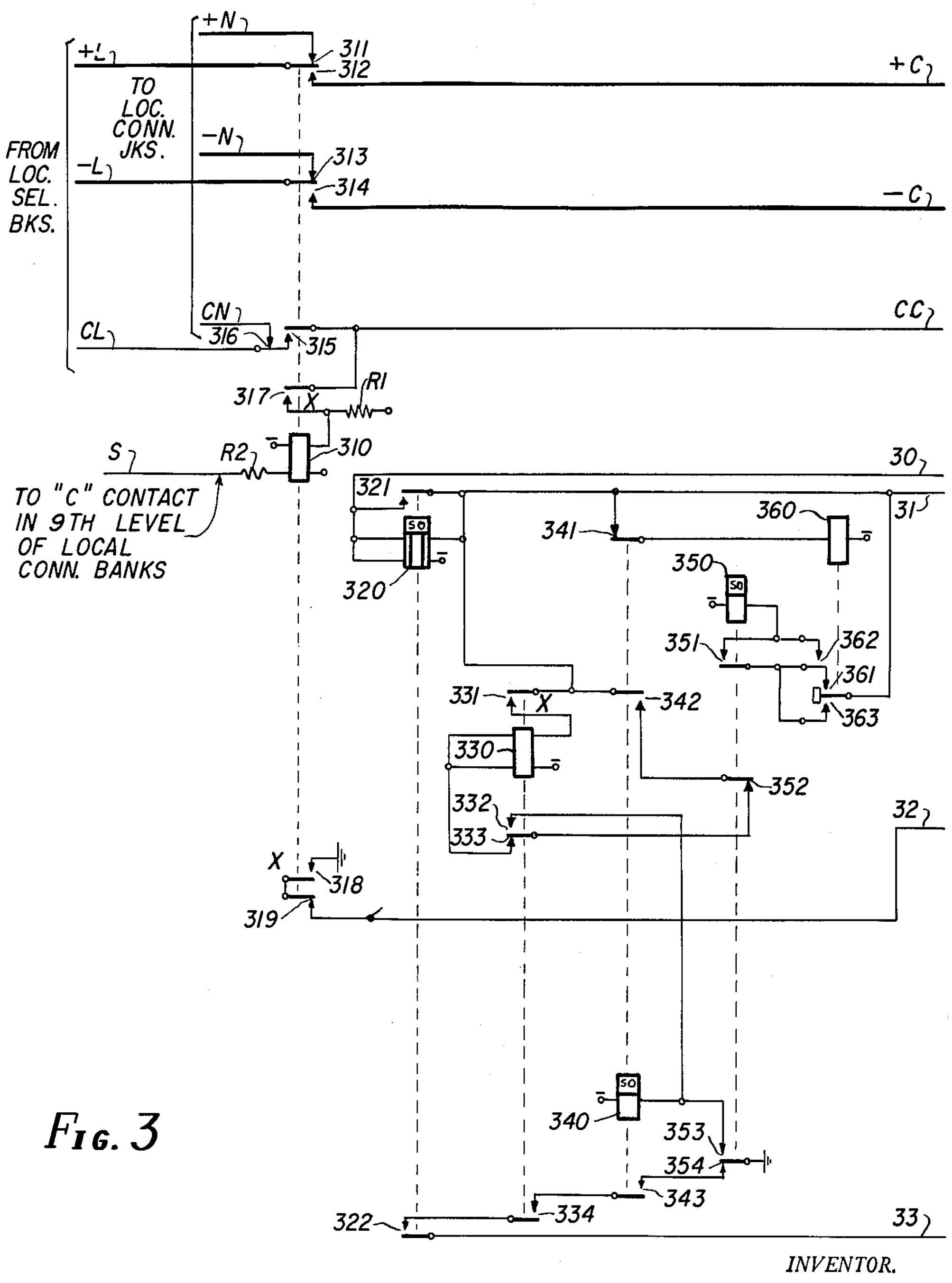
FIG. 3 represent a portion of the circuitry that provides access to the transfer allotter, a relay for providing tick tone and timing relays for providing a time-out alarm in case an initiated transfer has been abandoned.
Figure 4:
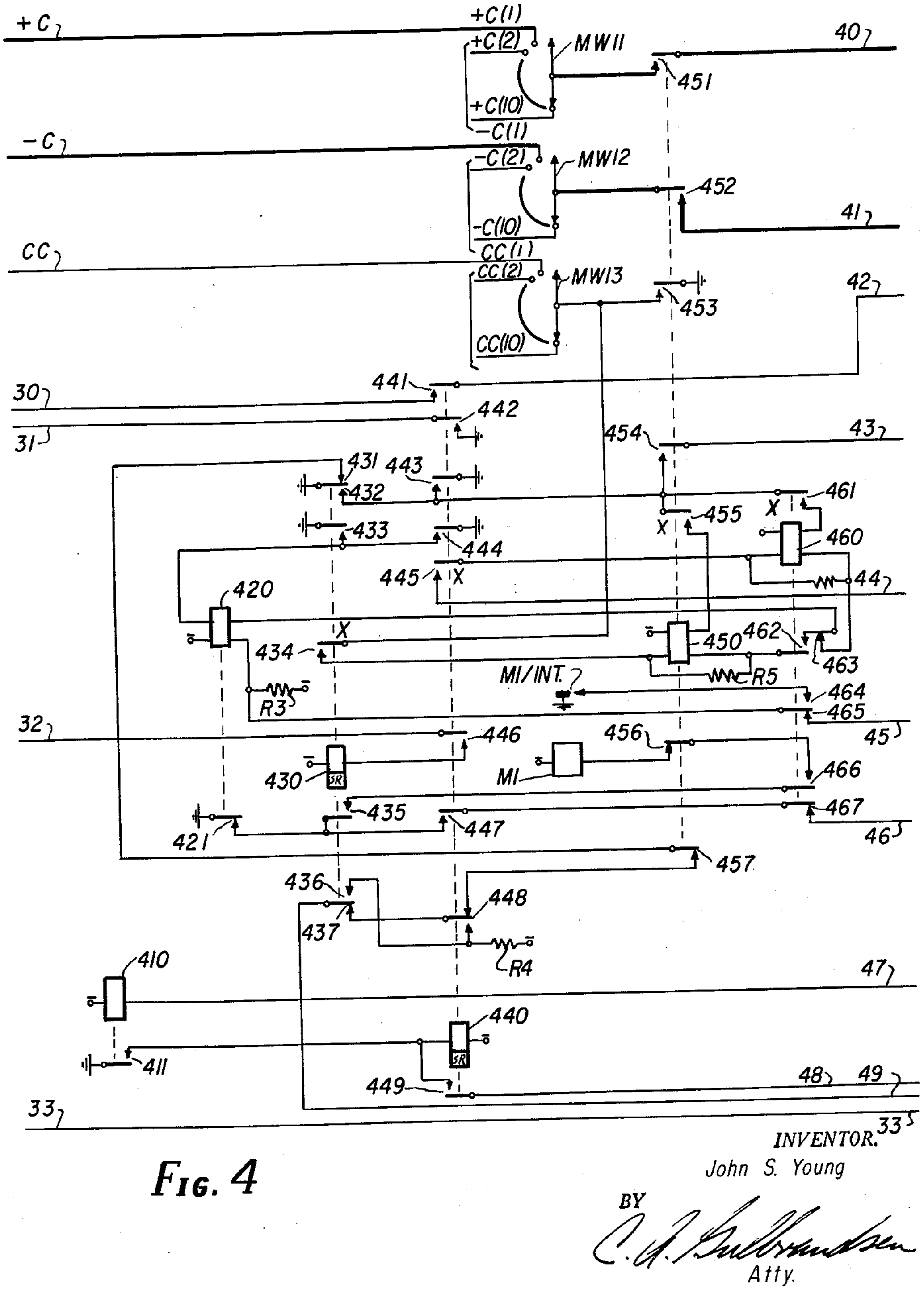
FIG. 4 represents a portion of the transfer allotter switch and the control circuits therefor.

Referring in particular to the detailed drawings of FIGS. 3, 4, 5 and 6, it will be seen that the adapter finder section of the transfer allotter switch has access to ten of the adapter circuits such as represented in FIGS. 5 and 6 and that the connector access finder section of the allotter switch has access to as many as 10 connector number access circuits such as represented and controlled by the switching relay 310 of FIG. 3.

It will be appreciated that the attendant's cabinet consists of the usual and well-known equipment and that while the key K has been called a night key, which would normally be operated at night, this key is also operated when the attendant's position is unattended. It will further be seen that the attendant's position at the attendant's cabinet is equipped with the usual and standard apparatus such as the supervisory and answer lamps, the hold key and the talk keys, all of which operate in the common and well-known manner.

It will further be seen that the automatic answering and transfer initiating circuit shown in detail in FIG. 7 is accessible from a special level of either the local connectors, or the connector associated with the incoming selector, thereby requiring the dialling of a special predetermined call number in order to access this circuit.

Upon referring to the trunking diagram shown in FIGS. 1 and 2, it will be seen that the subscribers 10 and 20 are local PABX subscribers and that they may be called directly from a central office and that they may make individual local PABX calls and individual outgoing calls to the central office. It is desired to point out that the equipment at subscriber stations 10 and 20 consists of the standard and well-known telephone which is equipped with a dial and the necessary circuitry to provide proper use and service. Hook switch contacts are shown as providing one means for transmitting the transfer initiating or transfer acceptance signal.

Normally, in the preferred disclosure of this system, the service of an attendant is required only when the completion of transfer calls are to be under the direct supervision of the attendant, or when certain of the incoming calls are routed to the automatic answering circuit.

On incoming calls, it will be seen that a call of this type is routed from the central office through the two-way dial trunk into FIG. 5 and through FIG. 6 to seize an incoming selector, with the first digit of the desired call number being dialled to seize a connector, which in turn is operated responsive to the dialling of the remaining digits of the call number to signal a desired local PABX subscriber. On outgoing calls from a local subscriber it will be seen that a call of this type is routed through a local finder-selector link, a special level of the local selector in response to the dialling of a special digit, into the two-way dial trunk and hence to the central office. It will be appreciated that the present arrangement makes no provisions whereby a local PABX subscriber may transfer the call to another local PABX subscriber during an outgoing call, since a transfer during this nature of call is rarely ever needed.

When it is determined by a called local PABX subscriber that the incoming call is to be transferred to another local station and if it is determined that the attendant will complete the transfer, the following brief operations take place, wherein the local subscriber either dials the single digit 1 or momentarily depresses his hook switch a single time, either of which will thereafter cause the adapter circuit to place a hold condition across the loop circuit, or talking conductors, to hold the incoming call, while initiating the signalling of the attendant at the attendant's cabinet. The attendant thereafter answers the call in a well-known manner and enters the held connection, at which time the attendant may converse with the local subscriber and upon receiving the desired information, requests the local subscriber to hang up. The attendant thereafter dials out over the incoming selector and its associated connector to signal the local subscriber to whom the call is to be transferred, provided that the second local subscriber operates his hook switch a single time to initiate acceptance of the call. At this time the attendant may retire from the connection. This second local subscriber may again initiate another transfer to another local subscriber in the same manner as previously described.

If the transfer of the call is to be both initiated and completed by the same called local PABX subscriber, the night key K at the attendant's cabinet will be operated, with the initiation of the transfer proceeding in the same manner as previously described, however, after the hold has been placed on the incoming connection, the adapter finder of the allotter is thereafter operated to hunt for and connect with the adapter circuit being used for the transfer operation. The allotter thereafter starts the operation of the tick-tone relay, which causes tick-tone to be applied to the connection to indicate to the local subscriber that he may now replace his receiver. After a reasonable length of time, the local subscriber again removes his receiver to take a local link into use and thereafter dials a special three digit transfer number to enter the held connection by way of the conductors at the left side of FIG. 3 and to thereafter cause the connector access finder section of the allotter to hunt for and connect with this local subscriber by way of the connector access circuit. At this time the tick-tone is removed from the connection and the local subscriber is able to dial out over the incoming selector and its associated connector to signal another local subscriber. When this second local subscriber answers the call, the first local subscriber may retire from the connection or remain thereon for a three party type of limited conference call. Either one of the two local subscribers may initiate and complete another transfer if it is desired, but subsequent to the other local subscriber hanging up.

Detailed operational descriptions will now follow.

*Outgoing Dialled Call From Local PABX Station Direct to Central Office*

Before starting the operational description of this section, reference will first be had with the trunking diagram represented in FIGS. 1 and 2. From this trunking diagram it will be assumed that an outgoing call of the above-mentioned type may be traced as extending from a local subscriber station such as 10, the line circuit individual thereto, an associated finder-selector link and a specific level of the selector, the two-way dial trunk and out over the associated line conductors to the central office subscriber.

Upon initiating this above-mentioned outgoing call to the central office, the local subscriber such as 10 originates the call in a well-known manner in order to take the local finder-selector link into use. It will be noted from the trunking diagram that the ninth levels of the local selectors are connected to the two-way dial trunk and it is therefore necessary that the subscriber 10 dial the prefix digit 9 in order to access this trunk. Upon connecting with an idle one of these two-way dial trunks, the number of the central office subscriber is thereafter dialled, with the connection being extended thereto in a well-known manner. Conversation may thereafter proceed and responsive to the calling and called parties replacing their receivers, the equipment is restored to normal in a well-known manner and thereafter conditioned to handle future calls.

*Incoming Dialled Call From Central Office Direct to Local PABX Station*

Before beginning the operational description of the above-mentioned type of call, it will be appreciated that the equipment in the central office and the two-way dial trunk as shown in block diagram and disclosed in FIG. 1 is assumed to be of any suitable and well-known type and the operations thereof are further assumed to be well-known in the art and will not be covered in detail in this specification.

Also, before starting the above-mentioned operational description, reference will first be had with the trunking diagram as represented in FIGS. 1 and 2 and the detailed drawings shown in FIGS. 5 and 6, wherein if it is assumed that local subscriber 20 is the called local party, it will be seen that the path of the incoming call from the central office may be traced as extending from the selector as shown in the central office, the two-way dial trunk shown in block diagram in FIG. 1, FIGS. 5 and 6, the incoming selector shown in block diagram in FIG. 1, the associated connector shown in block diagram in FIG. 2, and through the individual line circuit to signal the local subscriber station such as 20.

Responsive to the above-mentioned type of call being initiated by the central office, the calling loop is extended therefrom and through the two-way dial trunk into FIG. 5 by way of the line conductors +SW and −SW in a well-known manner. The above-mentioned calling loop to FIG. 5 may be assumed to be traced as extending from a battery potential (not shown), through a first winding of the line relay (not shown) in the incoming selector, the positive line conductor extending into FIG. 6, contacts 632, rectifier RE1, the positive line conductor 53 leading into FIG. 5, contacts 541, the break-after-make contact controlled by armature 532, the +SW line conductor leading to the two-way dial trunk, through the repeating coil therein (not shown), back over the −SW line conductor and into FIG. 5, the break-after-make contact controlled by armature 534, contacts 542, the negative line conductor 54 leading into FIG. 6, through rectifier RE2, contacts 633, out over the negative line conductor from FIG. 6 leading to the incoming selector and through a second winding of the above-mentioned line relay therein (not shown) in the incoming selector to battery (not shown).

Incoming loop pulses are repeated from the two-way dial trunk into the incoming selector over the above-traced loop circuit in a well-known manner, with the incoming selector also operating in a well-known manner to further extend the connection of the loop circuit into the associated connector. This associated connector thereafter operates over this loop circuit in response to receipt of dial pulses to further extend the connection to the line circuit individual to the local subscriber such as 20 to signal the subscriber of an incoming call.

Local subscriber 20 answers this incoming call in a well-known manner and conversation may thereafter take place between the calling and called party.

It is assumed that the connectors used in this system are of the well-known battery reversal type, wherein the connector is operated responsive to the called party answering for reversing the application of battery to the portion of the talking conductors extended to the repeating coil of the two-way dial trunk. It will be noted that the rectifiers RE1 and RE2 in FIG. 6 are non-conductive to this reversal of battery potential and the current, which is normally allowed to pass therethrough is now shunted down through the upper and lower windings of relay 620 to thereby cause relay 620 to operate.

It will be appreciated that the operation of relay 620 has no effect on the circuits during this type of call and merely prepares the adapter circuit of FIGS. 5 and 6 for further operation in the event that subscriber 20 may later desire to transfer the call, which operations will further be described later on in a subsequent section.

At the end of conversation and responsive to both the central office subscriber and the local subscriber 20 replacing their receivers, the equipment is restored to normal in a well-known manner and thereafter conditioned to handle future calls.

*Incoming Dialled Call From Central Office Direct to Local PABX Station-Transfer Initiated by Local PABX Station and Completed by Attendant*

Before beginning the operational description of the above-mentioned type of call, reference will first be had with the trunking diagram represented by FIGS. 1 and 2 and with the section entitled "Incoming Dialled Call From Central Office Direct to Local PABX Station," wherein it is assumed that an incoming call of this type has been established and conversation is in progress between the central office subscriber and the local PABX subscriber such as 20. At this stage in the operational description, it is assumed that a question has arisen during the conversation which requires the services of the local subscriber such as 10, thereby requiring the transfer of the call such as will hereafter be described in detail, with reference being had to FIGS. 3, 4, 5 and 6 of the drawings.

It will be appreciated that before beginning the above entitled operational description, it is believed necessary to describe the operation that takes place in the adapter circuit, such as represented in FIGS. 5 and 6, at the time that local subscriber 20 answered the incoming call. As mentioned in the previous section, the answering by local subscriber 20 caused the reversal of battery over the talking connection from subscriber 20 to the repeating coil in the two-way dial trunk in a well-known manner. As previously mentioned, the rectifiers RE1 and RE2 are no longer conductive in response to this reversal of battery and therefore direct the current flow through the respective upper and lower windings of relay 620, thereby causing this relay to operate. In actuating its contacts, relay 620 completes an obvious circuit for operating relay 630 at contact 621.

In actuating its contacts, relay 630 performs no useful function for thhe time being at contact 631, opens contacts 632 and 633 to remove rectifiers RE1 and RE2 respectively from the loop circuit, opens contacts 634 with no effect on the adapter circuit for the time being, closes contacts 635 to prepare a future circuit for relay 640, opens contacts 636 and closes contacts 637 to complete a charging circuit for the condenser C1 and performs no useful function for the time being at contacts 638 and 639. The charging circuit for condenser C1 may be traced as extending from ground at the night key contacts K7, up through the break contacts of armature 612, resistance R10, contacts 637 and the condenser C1 to battery. The plates of condenser C1 are thereby charged in a well-known manner. The circuits of the adpater of FIGS. 5 and 6 remain in this condition until it is decided by subscriber 20 that the call is to be transferred to a local subscriber such as 10, at which time the digit 1 is dialled or the hook switch is momentarily opened.

Responsive to the dialling of the digit 1 or the momentary opening of the hook switch, the loop circuit is momentarily opened to the polarized relay 620 and this relay restores. The restoring of the relay 620 opens the circuit to relay 630 so that relay 630 will thereafter restore, which closes contacts 636 to complete an obvious discharging circuit for the condenser C1 through the lower winding of relay 640. Relay 640 thereupon operates in a first step and closes only its X contacts 644, which completes an obvious locking circuit for itself and may be traced as extending from a busying ground (not shown) applied to the control, or C, conductor in the incoming selector, the C conductor extending therefrom to the adapter, through X contacts 644, contacts 551 and through the lower winding of relay 640 to battery. Relay 640 operates fully in response to this locking circuit and operates the remainder of its contacts. The full operation of relay 640 has no effect on the circuits of the adapter for the time being other than to prepare a series operating circuit for the relays 510 and 630 at contacts 646.

Relay 620 re-operates at the end of the dial pulse when the single digit 1 was dialled or at the time that the hook switch recloses and again completes an obvious circuit for operating relay 630. This time, the re-operation of relay 630 completes the circuit at contacts 638 whereby relays 510 and 530 operate in series, with relay 530 operating in a first step operation. This circuit may be traced as extending from ground at contact 638, contacts 646, conductor 62, contacts 554, the lower winding of relay 530, conductor 70, night key contacts K4, conductor 71, and through the upper winding of relay 510 to battery.

In operating in its first step operation, relay 530 closes only its X contacts 538 to prepare both a point in its future locking circuit and its future full or second step, operating circuit. In actuating its contacts, relay 510 closes contacts 512 and 511 to start the ringing machine and transmit ring-back tone to both the local subscriber and the central office party, closes contacts 513 to operate relay 520 over an obvious circuit, prepares a point in its locking circuit at contacts 514 and prepares a point in the circuit at contacts 515 for lighting the answer lamp at the attendant's cabinet. In actuating its contacts 521, relay 520 completes a circuit for operating relay 530 in its full operation over a path which may be traced from ground at contacts 521, conductor 61, the break after the make contact controlled by armature 613, conductor 60, X contacts 538 and through the upper winding of relay 530 to battery.

In operating fully, relay 530 completes an alternate point at contacts 531 for the application of ring-back tone to the connection to inform the central office party and the local subscriber 20 that the transfer of the call has been initiated and that the attendant is being signalled, closes the make-before-break contacts of armatures 532 and 534 for completing an obvious operating circuit for relay 550, performs no useful function during the present type of call at the make contacts of armatures 533 and 535, closes contacts 536 to provide an alternate point in the locking circuit for relay 640 to the C conductor of the incoming selector, closes contacts 537 with no apparent effect on the circuits for the present, opens contacts 539 to maintain the energizing circuit of relay 540 ineffective for the time being and at contacts 539′ completes the circuit for lighting the answer lamp at the attendant's cabinet.

In actuating its contacts, relay 550 opens a point in the previously described second step operating and locking circuit of relay 640 at contact 551, closes contact 552 and opens contact 553 with no effect on the adapter for the time being, opens the previously traced series energizing circuit of relays 510 and 530 at contacts 554, closes contacts 555 with no effect on the adapter for the time being, closes contacts 556 to provide a locking circuit for relay 510 and opens and closes contacts 557 and 558 respectively with no effect on the adapter for the time being.

The locking circuit for relay 510 may be traced as extending from ground at contacts 556, conductor 65, contacts 615, contacts K5 of the night key K, conductor 72, contacts 514 and through the lower winding of relay 510 to battery.

It will be noted that relay 550 provides transmission battery to hold the connection from the adapter circuit to the central office and will remain operated until the completion of the transfer.

The circuit for lighting the answer lamp may be traced as extending from ground at contacts 515, contacts 539′, conductor 33, contacts 617 and through the answer lamp ANS at the attendant's cabinet to battery.

The equipment thereby will remain in this condition until the attendant answers the incoming call, at which time the talk key is operated and a circuit is completed at contacts T1 of this key for operating relay 610. The transmission path is also extended to the attendant's telephone by means of the talk key. This circuit for operating relay 610 may be traced as extending from ground at talk key contacts T1 and through the lower winding of relay 610 to battery.

In actuating its contacts, relay 610 removes the previously described application of ring-back tone to the connection at contact 611, opens the break and closes the make contacts at armature 612 with no effect on the circuit for the time being, closes the make and opens the break contacts controlled by armature 613 for opening the previously traced full operation circuit of relay 530, operates the make-before-break contacts controlled by armature 614 for completing a locking circuit for itself, opens the previously traced locking circuit of relay 510 at contact 615, performs no useful function for the time being at the contacts controlled by armature 616 and at contacts 617 opens the previously traced circuit to the answer lamps ANS at the attendant's cabinet.

It will be noted, as previously mentioned, that at the time relay 530 operated fully, local subscriber 20 was removed from the connection with the central office party in response to the operation of the make-before-break contacts controlled by the respective armatures 532 and 534. Additionally, subscriber 20 was connected with the attendant over an obvious circuit responsive to the operation of the make contacts controlled by armatures 533 and 535, respectively.

It will be appreciated that the restoring of relay 510 in response to the operation of relay 610, when the attendant answered the signal, also removed the previously mentioned ring-back tone from the connection and opened the previously described operating circuit of relay 520. Relay 530 will restore responsive to the operation of relay 610 as mentioned and disconnect relay 550 from the transmission path leading to the central office and reconnect relay 550 to the transmission path leading to the attendant's telephone, thereby providing talking battery for the attendant. The restoring of relay 530 also opens the other multiple point in the locking circuit for relay 640, whereby this relay will restore with no effect on the circuits of the adapter for the time being. Relay 520 also restores at the time relay 530 restores, with no effect on the circuits at the present. Relay 550 will remain operated after the transfer to the attendant's transmission path.

After obtaining the necessary information from local subscriber 20 relating to the desired transfer, the attendant thereafter requests subscriber 20 to hang up, thereby causing the removal of reverse battery from the connection to allow relay 620 to restore. In restoring, relay 620 opens the operating circuit of relay 630 and this relay thereafter restores.

As previously mentioned, the operation of relay 610 at the time that the operator answered the signal completed an obvious charging circuit for the condenser C1, thereby providing means for re-energizing relay 640 at the time that contacts 636 were closed responsive to the restoration of relay 630. The restoration of relay 630 at contacts 639 also completed a circuit for energizing relay 540, which may be traced as extending from the ground at contacts 639, conductor 64, contacts 555, 539 and through the lower winding of relay 540 to battery. The closing of contacts 639 also completed an obvious circuit for lighting the supervisory lamp SUPY at the attendant's cabinet as an indication thereto that subscriber 20 had replaced his receiver. It will be noted that relay 640 will operate from the charged condenser C1, however relay 640 cannot lock operated to the C conductor, since this locking circuit is opened and relay 640 will subsequently restore. In actuating its contacts, relay 540 opens the loop circuit extending from the adapter circuit into the incoming selector at contacts 541 and 542 to allow the incoming selector to release in a well-known manner. At contacts 544, relay 540 completes a circuit for re-operating relay 530 over its upper winding to the grounded CSW conductor extending into the adapter from the two-way trunk circuit, closes contacts 545 to prepare a point in its own locking circuit to the future grounded C conductor extending to the incoming selector and at contacts 546 opens a circuit previously completed by contacts 639 to extinguish the supervisory lamp SUPY at the attendant's cabinet. Relay 530 re-operates over its upper winding to the grounded CSW conductor extending from the central office and functions as previously described, with the exception that the previously traced energizing circuit for relay 540 is opened at contacts 539 and a point in a different future locking circuit for itself is prepared at contacts 537.

At this point in the operational description, it is assumed that the incoming selector has released and ground is removed from the C conductor extending to the adapter circuit, thereby opening the locking circuit to relay 540. As previously mentioned, relay 640 re-operated from condenser C1 and then restored, thereby completing the above-mentioned different locking circuit for relay 530 at contacts 645. This circuit may be traced as extending from ground at contacts 556, conductor 65, the make-before break contacts of armature 614, contacts 645, conductor 58, contacts 537, conductor 59, the make-before-break contacts controlled by armature 613, conductor 60, X contacts 538, and through the upper winding of relay 530 to battery. Relay 540 restores at this time and extends the loop circuit at contacts 541 and 542 from the attendant to re-seize the incoming selector, opens the previously traced locking circuit for relay 530 to the grounded CSW conductor at contacts 544 and re-completes a circuit at contacts 546 for re-lighting the supervisory lamp SUPY at the attendant's cabinet. This re-lighting of the supervisory lamp at the attendant's cabinet is an indication to the attendant that the number of the local subscriber 10 to which the call is to be transferred may be dialled, with the incoming selector and its associated connector functioning in a well-known manner to extend the call thereto.

At the time that local subscriber 10 answers the call, battery is reversed as previously described to cause the operation of relay 620, which causes the re-operation of relay 630 also as previously described. It will be noted at this time that the operation of relay 630 completes the charging circuit for the condenser C1 to the ground at the make contacts of armature 612.

At this stage of the operational description it will be noted that conversation may take place between the attendant and the called local subscriber 10 and after determining that local subscriber 10 will accept the call, either the attendant or the local subscriber 10 may dial the single digit 1, or momentarily open their hook switch to momentarily open the loop circuit for restoring relay 620 as previously described. The restoring of relay 620 thereupon opens the circuit to restore relay 630, which at its contacts 636 completes the previously described circuit for causing the operation of relay 640 from the charged condenser C1. Relay 640 thereby operates in the same manner as previously described and locks to the grounded C conductor extending to the incoming selector. Relays 620 and 630 subsequently re-operate in the previously described manner when the loop circuit is reclosed. The operation of relay 640 opens the previously described locking circuit of relay 530 at 645 so that this relay will restore. The restoring of relay 530 thereafter completes the talking connection between the central office subscriber and the local subscriber 10 at the closing of the break-after-make contacts controlled by each of the armatures 532 and 534.

Conversation may now proceed and if it is necessary that subscriber 10 re-transfer this call to another local subscriber, the same procedure for re-transferring this call is followed as just described. However, if there is no need to transfer this call at the end of conversation, the equipment will restore to normal in a well-known manner in response to the calling and called subscribers hanging up their receivers. The equipment is now at rest and conditioned to handle future calls.

*Incoming Dialled Calls From Central Office Direct To Local PABX Station—Transfer Initiated and Completed By Local PABX Station*

Before beginning the operational description of the above-mentioned type of call, reference will first be had with the trunking diagram represented by FIGS. 1 and 2 and with the section entitled "Incoming Dialled Call From Central Office Direct To Local PABX Station," wherein it is assumed that an incoming call of this type has been established and conversation is in progress between the central office subscriber and the local PABX subscriber such as 20. At this stage in the operational description, it is assumed that a problem has arisen during the conversation which requires the attention of a local subscriber such as 10, thereby requiring the transfer of the call thereto by subscriber 20 in the manner such as will be described in detail later on in this section, with reference being had in detail to FIGS. 3, 4, 5 and 6 of the drawings.

In order to describe the above-mentioned type of call, it will be assumed that there is no attendant on duty at the attendant's cabinet, therefore the night key K will be moved to its operated position, thereby opening all the break contacts and closing all the make contacts.

It is believed unnecessary to repeat the operational description covering the extension of a call from the central office to the local subscriber station 20, since the operations are the same as described in the previous section. It will therefore be assumed that a call from the central office has been established with local subscriber 20, that it has been decided that the call is to be transferred to another local subscriber such as 10 and that up to this point all the operations are the same as previously describer.

At this stage of the operational description, the transfer of the call from local subscriber such as 20 to the local subscriber such as 10 is initiated responsive to the local subscriber 20 either dialling the digit 1, or momentarily opening his hook switch a single time. It will be noted at this time that the only relays operated in the adapter circuit are the relays 620 and 630 and that the operation of the relay 630 has completed the circuit for charging the condenser C1 over a path traced from the ground at contacts 431, contacts 457, the break contacts of armature 448, contacts 437, conductor 49, contacts K8 of night key K, the break contacts of armature 612, resistance R10, contacts 637 and to the positive plate of condenser C1.

The interruption of the loop circuit responsive to the digit 1 being dialled, or the hook switch being momentarily opened as previously mentioned, opens the loop circuit to relay 620 long enough to allow this relay to restore, whereby the circuit to relay 630 is opened and relay 630 also restores. The restoring of relay 630 completes a previously described discharging circuit for condenser C1 which causes relay 640 to operate partially and close its X contacts 644 to lock to the grounded C conductor extending to the incoming selector, with this locking circuit thereafter causing relay 640 to operate fully also as previously described. Relays 620 and 630 re-operate at the end of the dial pulse or the opening of the hook switch, with relay 630 completing a circuit for operating relays 530 and 410 in series at contacts 638. This circuit for operating relays 530 and 410 in series may be traced as extending from ground at contacts 638, contacts 646, 554, the lower winding of relay 530, conductor 70, contacts K3 of night key K, conductor 47, and through the winding of relay 410 to battery.

In operating, relay 530 closes only its X contact 538 for extending a marking potential to mark a contact in the bank accessible by the adapter finder wiper MW24. This marking may be traced as extending from battery through the upper winding of relay 530, X contacts 538, the break-after-make contact controlled by armature 613, conductor 61, and to mark the first contact in the bank accessible by wiper MW24. It will be appreciated that the battery through the resistance R11 is insufficient as a marking potential to this above-mentioned first contact.

In actuating its contacts, relay 410 completes an obvious circuit at contacts 411 for operating relay 440. The operation of relay 440 closes a point in the circuit for the application of tick-tone to the present connection at contacts 441, completes a circuit for the tick-tone relay 320 and the timing relay 360 at contacts 442, prepares points at contacts 444 and X contacts 445 in the future series operating circuit of relays 420 and 460, prepares a point in the operating circuit for relay 430 at contacts 446, completes a circuit to the motor magnet M2 of the adapter finder section of the allotter at contacts 447, opens the previously traced charging circuit of condenser C1 at the break contacts at armature 448, applies a resistance battery to the previously traced charging circuit of condenser C1 at the make contacts of armature 448 and at contacts 449 closes a point in a future locking circuit for itself.

At this stage of the operational description it will be noted that three operations are taking place at approximately the same time, that is, the motor magnet M2 of the adapter finder section of the allotter will hereafter be advancing its wipers MW21 through MW24 inclusive, the tick-tone relay 320 will be applying tick-tone to the connection and the timing relays will be functioning.

The adapter finder wipers MW21 through MW24 inclusive are advanced by the motor magnet M2 in a relatively well-known manner, wherein as motor magnet M2 operates upon its first energization the interrupter contacts M2/INT are closed for completing a circuit for operating relay 420 over its lower winding. Upon operating, relay 420 opens the operating circuit of motor magnet M2 at contacts 421. Motor magnet M2 thereupon restores and opens the operating circuit of relay 420 at the interrupter contacts M2/INT and relay 420 upon restoring again completes the operating circuit for motor magnet M2. This inter-action between motor magnet M2 and relay 420 continues until the wiper MW24 encounters the previously mentioned marking battery potential applied to one of the bank contacts, which in this case is shown as being the first contact in the bank. Responsive to wiper MW24 encountering this marking battery potential, a series operating circuit is completed for the relays 460, 420 and the full operation of relay 530.

As previously mentioned, the tick-tone relay 320 operates over a circuit extending from ground at contacts 442, conductor 31, the upper winding of relay 320 and through the lower winding of relay 320 to battery. This ground potential from contacts 442 is also applied to the tone conductor by way of the upper resistive winding of relay 320 during the time that slow-to-operate relay 320 is operating, at which time the upper winding of relay 320 is shunted by contacts 321 so that now the lower winding of relay 320 is insufficient to hold relay 320 operated and it will thereafter restore. It will be noted that upon restoring, relay 320 completes a circuit at its contacts 321 for applying the direct ground potential from contacts 442 to the tone conductor. As previously mentioned relay 320 will restore responsive to its upper winding being shunted by the contacts 321 and after a reasonable length of time will open these contacts to again complete its energizing circuit to the previously mentioned ground from contacts 442. For the time being the closing of contacts 322 by the relay 320 has no effect on the present circuits. This inter-action of relay 320 for alternately interrupting and completing its own circuit to thereby cause it to alternately restore and re-operate also allows the ground potential from contacts 442 to be applied to the tone conductor first through the resistive winding of relay 320 and then directly applied thereto to apply the tick-tone to the connection in a well-known manner. This tick-tone circuit may be traced as previously described first through the upper winding of relay 320 and then by way of the closed contacts 321 through the conductor 30, contacts 441, conductor 42 contacts 642, the upper winding of relay 640, contacts 635 and to the negative line conductor of the connection, whereby this tick-tone is received by the central office subscriber as an indication that the transfer is in progress, while the receipt of the tick-tone by the local subscriber 20 is an indication to him that he should now replace his receiver in order to release the incoming selector and associated connector.

At the time that the tick-tone relay was functioning to apply tick-tone to the connection, it was previously mentioned that the timing relays were also started. This circuit for initiating the operation of the timing relays may be traced as extending from ground at contacts 442, conductor 31, contacts 341 and through the winding of relay 360 to battery. It will be noted that relay 360 has a weighted, or vibrating type, armature, which functions in the normal and well-known manner for completing an obvious circuit to the slow-to-operate relay 350. Relay 350 operates after a reasonable length of time and completes an obvious circuit for operating the slow-to-operate relay 340 at contacts 353, which at contacts 341 opens the previously traced energizing circuit to relay 360, prepares a point in the energizing circuit of relay 330 at contacts 342 and prepares a point in a future alarm circuit at contacts 343. After a reasonable length of time relay 360 will restore to open the circuit to relay 350, which also after a reasonable length of time will restore. The restoring of contacts 352 by relay 350 thereafter completes a circuit for operating relay 330 which may be traced as extending from ground at contacts 442, conductor 31, down through contacts 342, 352, 333 and through the lower winding of relay 330 to battery. In actuating its contacts, relay 330 closes its X contacts 331 to lock by way of its lower and upper windings to the previously mentioned ground at contacts 442, completes a circuit at contacts 332 for locking relay 340 in parallel with relay 330 to the previously mentioned ground and at contacts 334 prepares another point in the alarm circuit.

At this point in the operational description if it is assumed that the local subscriber such as 20 has not replaced his receiver to release the present connection, the previously described alternate operations and restorations of relay 320 will intermittently complete and open the alarm circuit at contacts 322. This alarm circuit may be traced as extending from ground at contacts 354, contacts 343, 334, 322, conductor 33, up through conductor 69, the audible signal 650 and contacts K1 of night key K to a common battery. This audible signal serves to inform the attendant or an extension user that a time-out has occurred and that a common predetermined transfer number should be dialled by the attendant or the extension user to seize the allotter and connect with the central office party in order to provide service thereto. It will be noted that this time-out normally occurs in the event that a transfer call has been initiated and the completion of the transfer has been abandoned or has not been carried out.

The previously mentioned series operating circuit for the relays 460, 420 and the full operation of relay 530 may be traced as extending from ground at contacts 444, the upper winding of relay 420, the break-after-make contact 463, the lower winding of relay 460, X contacts 445, motor magnet wiper MW24 and engaged first contact, the break-after-make contact controlled by armature 613, conductor 60, X contacts 538 and through the upper winding of relay 530 to battery.

In operating, relay 420 opens a point in the pulsing circuit to the magnet M2 at contacts 421. Relay 460 upon operating, closes its X contacts 461 to lock over an obvious circuit to ground at contacts 443, while the closing of the make-before-break contacts 462 prepares a point in the series operating circuit of relays 420 and 450, the opening of the break-after-make contacts 463 opens the previous energizing circuit to itself while the opening of contacts 465 and the closing of contacts 464 opens a point in the previous interrupter circuit from magnet M2 to relay 420 and prepares a point in the interrupter circuit from the magnet M1 to the relay 420, respectively, a point is prepared in the pulsing circuit to the magnet M1 at contacts 466 and a further point in the pulsing circuit to the magnet M2 is opened at contacts 467. Since it was mentioned above that relay 460 opened its previously traced energizing circuit, the opening of this circuit also allows relay 420 to restore, which prepares a further point in the pulsing circuit to the magnet M1 at contacts 421.

In operating completely, relay 530 of the adapter completes a previously described energizing circuit for operating relay 550. The operation of relay 550 completes a circuit for locking relay 440 operated from ground at its contacts 556, while the opening of contacts 554 opens the previously traced grounded start conductor for releasing the start relay 410. It will also be noted that relay 550 provides supervisory battery in a well-known manner over the connection leading to the central office.

As previously mentioned, the receipt of tick-tone advises the local subscriber such as 20 to replace his receiver, which will cause the release of the incoming selector and associated connector in the connection in a well-known manner, with this release subsequently causing relays 620, 630 and 640 to restore all as previously described.

After the lapse of a reasonable length of time, local subscriber 20 removes his receiver to take a local finder-selector link into use in a well-known manner. Subscriber 20 thereafter proceeds to dial a three digit predetermined transfer number to extend a connection whereby the connector access finder portion of the allotter operates to connect therewith in a manner to be described in detail hereafter. It will be assumed for the sake of the present description that the transfer number is the three digit number "891."

Upon referring to the trunking diagram of FIGS. 1 and 2 and to the detailed schematic diagram of FIG. 3 it will be seen that responsive to the local subscriber 20 dialling the first digit 8 of the transfer number over the local link, a connection is extended into FIG. 3 over the +L, −L and CL conductors and back out of FIG. 3 by way of the unoperated contacts of switching relay 310 and over the +N, −N and CN conductors to the local connector. It will be pointed out at this time that a connection extends from the first contact of the ninth level accessible by the C wiper of the local connector over the conductor marked S to the lower winding of the relay 310. Therefore, with the local connector being operated in a well-known manner responsive to the dialling of the second digit 9 and the third digit 1 of the transfer number and the C wiper of this local connector engaging the above-mentioned S conductor, a ground (not shown) is extended in a well-known manner from the connector for operating the switching relay 310 of FIG. 3.

Switching relay 310 is a two step relay and will only operate in its first step operation over the above-traced circuit to close X contacts 317 and 318. The closing of X contacts 317 applies a marking battery potential by way of the CC conductor to mark the first contact in the bank accessible by the connector access finder wiper MW13 and the closing of the X contacts 318 completes a circuit for operating relay 430. This circuit for operating relay 430 may be traced as extending from ground at X contacts 318, contacts 319, conductor 32, contacts 446 and through the winding of relay 430 to battery.

In actuating its contacts, relay 430 applies a multiple holding ground at contacts 432 over an obvious circuit for maintaining relay 460 operated, applies another multiple ground at contacts 433 for subsequent use by the allotter, closes X contacts 434 to apply a ground potential to the wiper MW13, closes contacts 435 for completing an obvious circuit for operating the magnet M1, and performs no useful function for the time being at contacts 436. The ground applied to the wiper MW13 may be traced as extending from contacts 433, the upper winding of relay 420, the make contacts 462, the lower winding of relay 450, X contacts 434 and to the wiper MW13.

Motor magnet M1 operates over its energizing circuit to advance its connector access finder wipers MW11 through MW 13 one step and at the same time close its interrupter contacts M1/INT to complete an obvious circuit for operating relay 420 over its lower winding. The operation of relay 420 opens the energizing circuit to motor magnet M1 at contacts 421, whereby motor magnet M1 restores to open the circuit to relay 420. This inter-action between relay 420 and motor magnet M1 continues until wiper MW13 encounters the previously described battery potential applied to its first bank contact thereby completing a series circuit for operating relays 420 and 450. It will be pointed out at this time that the ground potential as previously traced through the upper winding of relay 420 and the lower winding of relay 450 and from wiper MW13 and engaged first contact through the upper winding of relay 310 is of insufficient strength to cause the second step operation of relay 310 at this time.

In actuating its contacts, relay 420 opens the energizing circuit of motor magnet M1 at contacts 421 to prevent further advance of the connector access finder wipers MW11 through MW13. In actuating its contacts, relay 450 closes its X contacts 455 to lock itself operated over its upper winding to the ground at contacts 443, closes contacts 451 and 452 to extend the talking conductors into the adapter circuit of FIGS. 5 and 6, applies a direct ground at contacts 453 for both shunting the upper winding of relay 420 and the lower winding of itself and for completing the operating circuit of relay 310 in its second step, performs no useful function for the time being at contacts 454, opens a further point in the operating circuit of motor magnet M1 at contacts 456 and performs no useful function for the time being at contacts 457. Relay 420 may restore at this time with no effect on the circuits of the connection.

The circuit for operating relay 310 in its second step may be traced as extending from ground at contacts 453, wiper MW13 and engaged first bank contact, conductor CC, X contacts 317 and through the upper winding of relay 310 to battery.

In actuating its contacts, relay 310 opens contacts 311, 313 and 316 and closes contacts 312, 314 and 315 to disconnect and release the local connector from the connection with local subscriber 20 and thereafter extend the connection from local subscriber 20 through the allotter switch and into the adapter circuit of FIGS. 5 and 6, while the opening of contacts 319 opens the energizing circuit of relay 430 and this relay will thereafter restore.

It will be appreciated that the extension of this connection from local subscriber 20 into the adapter circuit of FIGS. 5 and 6 again re-establishes a transmission path between local subscriber 20 and the central office subscriber.

It will also be noted that the loop circuit from local subscriber 20 is also extended through the adapter circuit of FIGS. 5 and 6 to seize the incoming selector in a well-known manner, whereby ground is returned from the incoming selector in response thereto for completing a circuit to operate relay 610. This circuit for operating relay 610 may be traced as extending from ground (not shown) in the incoming selector, back over the C conductor, conductor 57, contacts 552, conductor 63, contacts 647, the break contact controlled by armature 614 and through the upper winding of relay 610 to battery.

In actuating its contacts, relay 610 performs no useful function for the time being at contacts 611, armature 612, and contacts 617, while the closing of the make contact and the opening of the break contact controlled by armature 613 transfers the holding circuit of relay 530 to a different ground potential, the closing of the make contact and the opening of the break contact controlled by armature 614 completes the transfer of the holding circuit of relay 530 and also completes an obvious holding circuit for relay 610, the opening of contacts 615 opens the holding circuit of relay 440 and the closing of the make contacts of armature 616 completes the transfer of the holding circuit for the relays 450 and 460. The new holding circuit of relay 530 may be traced as extending from ground at contacts 556, conductor 65, the make contact of armature 614, contacts 645, conductor 58, contacts 537, conductor 59, the make contact controlled by armature 613, conductor 60, X contacts 538 and through the upper winding of relay 530 to battery. The holding circuit for the relays 450 and 460 may be traced as extending from ground at contacts 556, conductor 65, make contacts of armature 616, conductor 66, the first contact of the bank engaged by wiper MW23, conductor 43, contacts 454, down through the X contacts 455 and 461 and through the upper windings of relays 450 and 460, respectively, to battery. Relay 440 restores at this time with no effect on the circuits other than to open the connection from the tick-tone relay to the tone conductor at contacts 441 and to remove the operating ground from the timing relays at contacts 442. The operated timing relays may thereafter restore with no effect on the circuits during the remainder of the call.

It will be pointed out at this time that local subscriber 20 may converse with the central office party, however, at this stage of the operational description it is assumed that local subscriber 20 will proceed to dial the call number of the desired local subscriber such as 10, with the incoming selector and associated connector functioning in a well-known manner to extend the connection thereto. At the time that the local subscriber 10 answers the call, battery is reversed over the connection as previously described for operating the polarized relay 620 and causing the subsequent operation of relay 630 also as previously described.

It will be pointed out at this stage of the operational description, a modified type of conference call exists, wherein the two local subscribers 10 and 20 and the central office subscriber are in the conference. Also, if it is assumed that subscriber 20 will retire from the above-mentioned three party connection by replacing his receiver, his local link will restore in a well-known manner and the loop circuit that previously held relay 550 operated will be opened and this relay will restore to remove the operating ground at contacts 556 to open the previously traced holding circuits to release the relays 450, 460, 530 and 610.

The allotter and the adapter are thereby restored to normal, while still maintaining the connection between the central office subscriber and the local subscriber 10 over just the transmission path (as previously described) of the adapter.

It will be noted that local subscriber 10 may initiate and complete a second transfer in the same manner as just described wherein local subscriber 20 initiated and completed the transfer. If it is assumed that local subscriber 10 does not desire to accept transfer of the call or that it is necessary to call another local subscriber, local subscriber 10 may retire from the above-mentioned three party connection by replacing his receiver. The replacing of the receiver by subscriber 10 causes the incoming selector and its associated connector to restore, whereby relays 620 and 630 will also restore. The incoming selector and its associated connector will be re-seized and the allotter and adapter circuits are thereby conditioned in the same manner as previously described and local subscriber 20 may again call another local subscriber to transfer the call to this subscriber if he will accept it.

At the end of conversation and responsive to the central office subscriber and the local subscriber replacing their receivers, the equipment is restored to normal in a well-known manner and conditioned to handle future calls.

*Automatic Answer, Attendant Signalling and Transfer Initiating Circuit*

Referring to FIG. 2 of the trunking diagram and in particular to the detailed portion represented by FIG. 7, it will be noted that this automatic answer, attendant signalling and transfer initiating circuit is seized through a special level of either the connector associated with the incoming selector or the local connector, with this level being disclosed from the drawings as the tenth level.

During this portion of the operational description, it will be assumed that all incoming calls over this connector level will be completed by the attendant. Therefore, on an incoming call and in response to the incoming selector being seized, and the next digit being dialled the following two digits will route the call over the tenth level to the +, — and C conductors incoming to FIG. 7.

It will be noted that ground potential is extended from the connector into the automatic answer circuit over the C conductor in a well-known manner for operating relay 720. This operation of relay 720 completes the extension of the loop circuit from the connector over the + and — conductors at contacts 722 and 723 for operating relay 750 and extends ground at contact 721 to extend a future operating ground to other relays in the circuit.

In actuating its contacts, relay 750 prepares a point in the locking circuit to relay 730 at contact 751, completes a circuit at contact 753 for operating 740 and prepares a point in the locking circuit to relay 710 at contact 754.

Relay 740 is constructed as being slow to operate, and after a reasonable length of time will operate to prepare a point in the future operating circuit of relay 730 at contact 741, completes its own obvious locking circuit at contact 742 and opens the operating loop circuit to restore relay 750 at contact 743.

It will be noted that at this time, relay 730 is in the process of operating and relay 750 is in the process of restoring, with the circuit to relay 750 being re-completed at contact 732 of relay 730 so that relay 750 will actually operate before it has had time to restore. At the remainder of its contacts, relay 730 completes its own obvious locking circuit at contact 731 and at contact 733 completes an obvious locking circuit for the relay 710.

In summation, it will be appreciated that this circuit of FIG. 7 functions as follows: Wherein the call number as dialled by the central office subscriber routes the call over a special level of the connector to the answering circuit where the loop circuit is extended through the relay 750 to simulate an answering operation such as if the call were actually answered by a called subscriber. This simulated answer causes equipment in the connector to operate in the well-known manner, whereby reverse battery is returned to the adapter circuit of FIGS. 5 and 6 for causing the same operations therein as described in the previous sections. The operation of the relay 740 momentarily interrupts the loop circuit for simulating the initiation of a call transfer, wherein the dialling of a single digit 1 or of the momentary opening of the hook switch is the transfer initiating signal such as described previously. The subsequent operation of relay 730 re-completes this loop circuit to simulate the completion of the dialling of the digit 1 or the re-closing of the hook switch contacts. This momentary interruption of the loop circuit causes the adapter circuit to function in the same manner as described in the previous section entitled "Transfer Initiated by Local PABX Station and Completed by Attendant."

Since no subscriber is connected to FIG. 7, it will be seen that on this type of a routed call, the adapter circuit of FIGS. 5 and 6 is used only to signal the attendant and is not used as a means for call transferring of a call as was the case in the earlier sections.

The attendant will answer and extend the call in the usual and well-known manner and at the end of conversation and responsive to the calling and called subscribers replacing their receivers, the equipment is restored to normal and conditioned to handle future calls.

Having described my invention and what is considered new and is desired to have protected by Letters Patent will be pointed out in the following claims.

What is claimed is:

1. In a telephone system; a local exchange and a distant exchange; a plurality of local subscriber lines in said local exchange: switching means for establishing a signalling connection from said distant exchange to one of said local subscribers; said connection including a two way trunk circuit, an adapter circuit, an incoming selector switch having an associated connector switch and a local line circuit associated with said one local subscriber; holding means in said adapter circuit; control means in said adapter circuit operated in response to the initiation of a transfer of said incoming connection by said one local subscriber for operating said holding means to place a hold condition across said connection in said adapter to hold the portion of said connection extending from said adapter through said two-way trunk circuit to said distant exchange; an attended switchboard; means operated in response to the operation of said control means for signalling the attendant at said switchboard that the transfer of a call has been initiated; means in said adapter operated in response to the answering of said signal by said attendant for establishing a transmission path between said attendant and said one local subscriber; means in said adapter operated in response to said one local subscriber disconnecting from said transmission path for initiating the release of said incoming selector and associated connector; means in said adapter for thereafter seizing said incoming selector and associated connector over a connection including said attendant; said incoming selector and associated connector being directively operated under control of said attendant to extend a signalling connection to another local subscriber; means operated subsequent to answering of said last mentioned signalling connection by said other local subscriber for re-operating said control means to release said holding means; whereby said release of said holding means removes said hold condition from said portion of said connection extending from said adapter to said distant exchange and completes the transfer connection between said distant exchange and said other local subscriber over a connection including said two way trunk circuit, said adapter circuit, said incoming selector switch and associated connector switch and the local line circuit associated with said other local subscriber.

2. In a telephone system, a local exchange and a distant exchange, a plurality of local subscriber lines in said local exchange, means for establishing an incoming signalling connection from said distant exchange to one of said local subscribers, an adapter circuit included in said signalling connection, holding means in said adapter circuit, control means in said adapter circuit operated in response to the initiation of a transfer of said incoming connection by said one local subscriber after answering said signalling connection for operating said holding means to place a hold condition on a portion of said established connection extending from said adapter to said distant exchange, an attended switchboard, means operated in response to the operation of said control means for signalling the attendant at said switchboard, means in said adapter circuit operated in response to the answer of said signal by said attendant for completing a talking connection between said attendant and said one local subscriber over the other portion of said established connection, means in said adapter operated in response to said one local subscriber disconnecting from said talking connection for initiating the release of said other portion of said established connection, means in said adapter for thereafter seizing said released other portion of said connection for use by said attendant, whereby said attendant may directively operate said other portion of said connection to extend a signalling connection to another local subscriber, means operated subsequent to answering of said last mentioned signalling connection by said other local subscriber for re-operating said control means to release said holding means, whereby said release of said holding means removes said hold condition from said other portion of said connection and completes the transfer connection between said distant exchange and said other local subscriber.

3. In a telephone system such as claimed in claim 2, including means operated by said control means for informing said distant exchange over said held portion of said connection and for informing said local subscriber over the other portion of said connection that said attendant is being signalled.

4. In a telephone system, a local exchange and a distant exchange, a plurality of local subscriber lines in said local exchange, a two-way trunk circuit, automatic switching means controlled by said distant exchange over said two-way trunk circuit for establishing a connection to a desired one of said local subscribers, means at said local subscriber lines for transmitting a transfer signal therefrom, subscriber controlled means in said connection operated in response to receipt of a transfer initiation signal from said one local subscriber for holding the portion of said connection extending therefrom through said two-way trunk circuit to said distant exchange, a local switchboard having an operator position thereat, means operated in response to said operation of said subscriber controlled means for signalling said operator position, means in said subscriber controlled means operated in response to said operator answering said signal for extending a connection from said operator position to said one local subscriber by way of said automatic switching means, said automatic switching means first being released in response to said one local subscriber terminating said connection and thereafter seized over said subscriber controlled means by way of the said connection extending from said operator position, whereby said automatic switching means is directively operated under control of said operator to extend a signalling connection to another of said local subscribers, and means in said subscriber controlled means operated in response to said other local subscriber answering said signalling connection from said operator for preparing said operated subscriber controlled means to receive another transfer signal, said prepared operated subscriber controlled means being thereafter released in response to receipt of a transfer signal from said other local subscriber, as an indication of acceptance of said transfer, for releasing said held portion of said connection and completing a connection from said distant exchange to said other local subscriber over said two-way trunk circuit and said automatic switching means.

5. In a telephone system, a distant exchange and a local exchange, a two-way trunk circuit and a special service circuit in said local exchange, automatic switching means controlled by said distant exchange over said two-way trunk circuit for extending an incoming connection to said special service circuit, an adapter circuit included in said connection between said two-way trunk circuit and said automatic switching means, means in said special service circuit for operating said automatic switching means to simulate a subscriber answer operation of said connection, normally un-operated conditioning means in said adapter circuit operated in response to receipt of said simulated answer operation for preparing control circuits therein, means in said special service circuit momentarily interrupting said simulated answered connection for momentarily restoring said conditioning means to complete said prepared circuits, means operated in response to said completion of said certain of said prepared circuits for applying a hold condition on the portion of said connection extending from said adapter circuit to said distant exchange, an attended switchboard in said local exchange, and means operated in response to said completion of other of said prepared circuits for signalling the attendant at said switchboard that said incoming connection has been both answered and held and is awaiting disposition by said attendant.

6. In a telephone system, a distant exchange, local exchange subscriber lines, automatic switching means operated in response to an incoming call from said distant exchange for establishing a connection to a desired one of said local subscriber lines, an adapter circuit included in said connection between said automatic switching means and said distant exchange, means for transmitting a transfer signal from said one local subscriber line to said adapter circuit, holding means, certain control means operated in response to receipt of said transfer signal for operating said holding means to place a hold condition on the portion of said connection extending from said adapter circuit to said distant exchange, an allotter switch having an adapter finder and a connector access finder, means operated in response to the operation of said certain control means for operating said adapter finder to connect to said adapter circuit, means at said one local subscriber line operated subsequent to said adapter finder connecting with said adapter circuit for releasing only said automatic switching means, a local connector including a special access level in said local exchange, local switching means having access to said local connector operated in response to a local call being initiated by said one local subscriber line, subsequent to said release of said automatic switching means, for extending a local connection therefrom to said special access level, a marking potential, other control means operated a first time in response to said extension of said local connection to said special access level, first means operated in response to said first operation of said other control means for extending said marking potential to said connector access finder, second means operated in response to said first operation of said other control means for initiating the operation of said connector access finder to hunt for and connect with said marking potential, means including circuit means in said allotter operated in response to said connector access finder connecting with said marking potential for preparing the extension of said local connection and for operating said other control means a second time, means operated in response to said second operation of said other control means for completing the extension of said local connection to said adapter circuit to seize said automatic switching means, said seized automatic switching means thereafter directively operated under control of said one local subscriber line for further extending said local connection to another local subscriber line, said certain control means reoperated in response to answering of said local connection by said other local subscriber line for releasing said holding means, whereby said hold condition is removed from said portion of said connection extending to said distant exchange and a transfer of said first connection to said other local subscriber is completed.

7. A telephone system such as claimed in claim 6, including additional means operated responsive to said second operation of said other control means for disconnecting said local connector from said local connection, at the time said local connection was extended into said adapter circuit, to prepare said local connection for subsequent switch controlling operations.

References Cited in the file of this patent

UNITED STATES PATENTS

| | | |
|---|---|---|
| 2,056,752 | Voss | Oct. 3, 1936 |
| 2,395,155 | Voss | Feb. 19, 1946 |
| 2,833,863 | Kosten | May 6, 1958 |